April 29, 1930.  P. E. FENTON  1,756,186
RESILIENT SCREW STUD
Filed Sept. 24, 1928
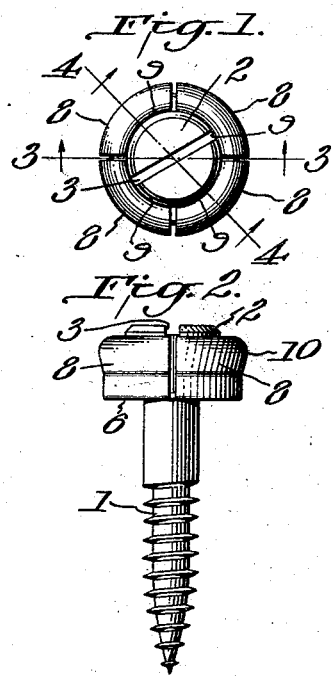
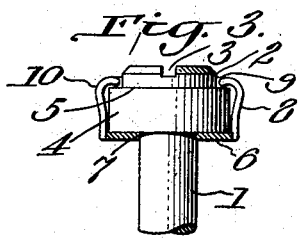
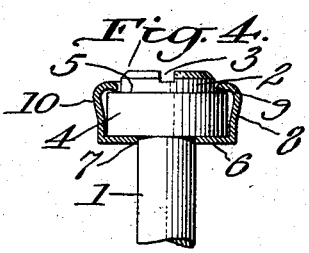
Inventor:
Paul E. Fenton
by
Attorney.

Patented Apr. 29, 1930

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

RESILIENT SCREW STUD

Application filed September 24, 1928. Serial No. 308,040.

The object of this invention is to provide a screw stud, having an applied resilient shell, to function as the resilient member of a snap fastener, the complemental member of the snap fastener being a rigid non-resilient socket of any usual or approved construction.

The invention is a variation of the resilient screw stud forming the subject of my concurrent application filed September 24, 1928, Serial No. 308,039; the difference between the two residing, primarily, in the form of the head of the screw and the construction of the resilient shell.

The invention consists of a cap screw, threaded for use in a wood or metal support, the head of the screw being of two diameters, the upper diameter containing the nick and the lower and larger diameter extending laterally beyond the smaller diameter, to afford a top ledge at a lower level than the upper level of the nicked portion, and a shell attached to the head and having spring wings slidably resting upon the ledge, and bulged outwardly so as to give the necessary resilience to engage with and be disengaged from a non-resilient socket, as I will proceed now to explain more fully and finally claim.

In the accompanying drawings illustrating the invention, in the several figures of which like parts are similarly designated, Figure 1 is a top plan view, and Fig. 2 is a side elevation of one embodiment of the invention. Fig. 3 is a fragmentary elevation of the head end of the screw with the shell in cross section, the plane of section being on the line 3—3 of Fig. 1. Fig. 4 is a fragmentary elevation similar to Fig. 3, with the shell in section in the plane of line 4—4 of Fig. 1.

The screw has the threaded end or shank 1, made either for use as a wood screw, as or as a metal screw, adapted for use, in a wooden support or a metal tact with the base of the head. From this base 6, spring a series of wings 8, the adjacent edges of which are out of contact, and the tips 9 of these wings are bent over and rest upon the ledge 5, around the nicked portion of the head, with sufficient clearance between the two to effect a sliding movement of the tip as the wings are compressed and expanded in their engagement with the socket member of the snap fastener. The wings below the tips are bulged outwardly at 10, to form an engaging surface within the socket member of the snap fastener.

As will be observed, the center of the of the screw projects above the surface of the resilient shell in such manner as to afford a certain amount of protection for the top, which otherwise would tend to in case it should be hit by a sharp blow the shell and possibly render it inoperative. As already indicated a slight amount of clearance between the turned tips on the top of the shell projecting part of the head of the screw, the space afforded by this difference, permits the shell to contract in the process of engagement or disengagement with the socket.

Variations in the details of the invention are permissible within the scope of the invention and the scope of the following.

What I claim is:—

1. A resilient screw stud, the smaller diameter head, to form a ledge on the larger, and a resilient shell in contact with the screw and having the head and bulged outwardly, the said ledge.

2. A resilient screw stud having larger diameter head portion, and a smaller diameter head and having a resilient shell overlying the ledge.

3. A resilient screw stud, the two diameters, nick

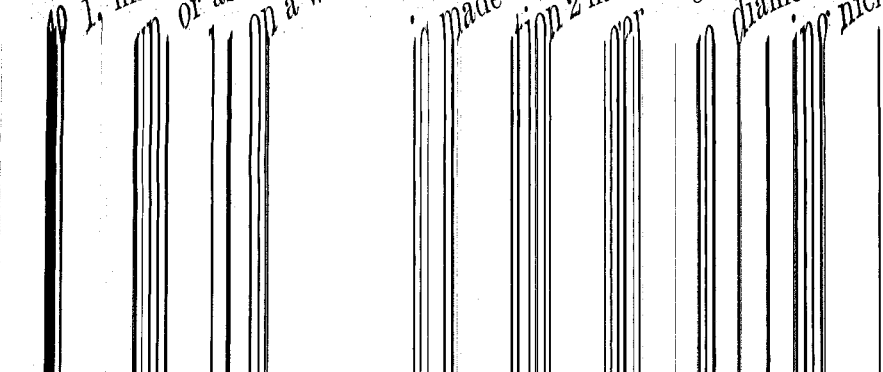

affording a ledge at a lower level than the upper level of the nicked portion, and a spring shell surrounding the head and having a base engaging its bottom and tips lying on the ledge and below the extreme top of the head, whereby said tips are protected from injury by blows on the head.

In testimony whereof I have hereunto set my hand this 21st day of September, A. D. 1928.

PAUL E. FENTON.